United States Patent Office 2,978,371
Patented Apr. 4, 1961

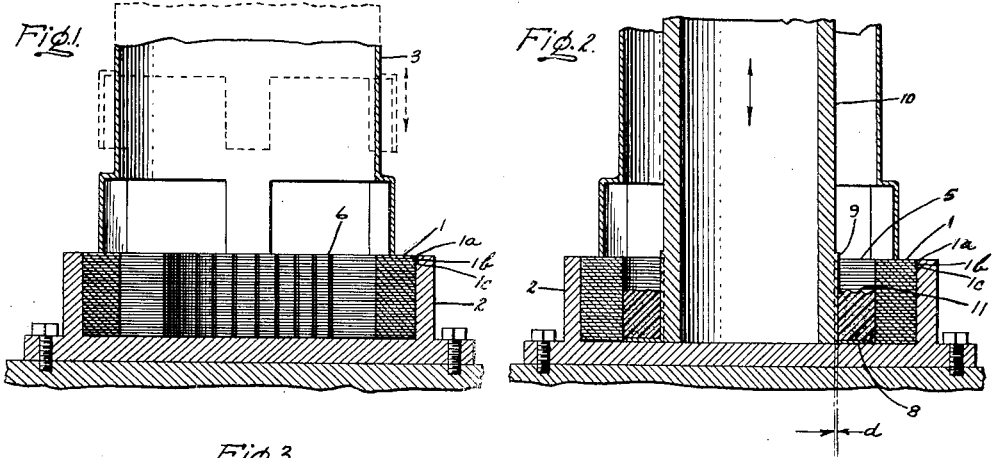
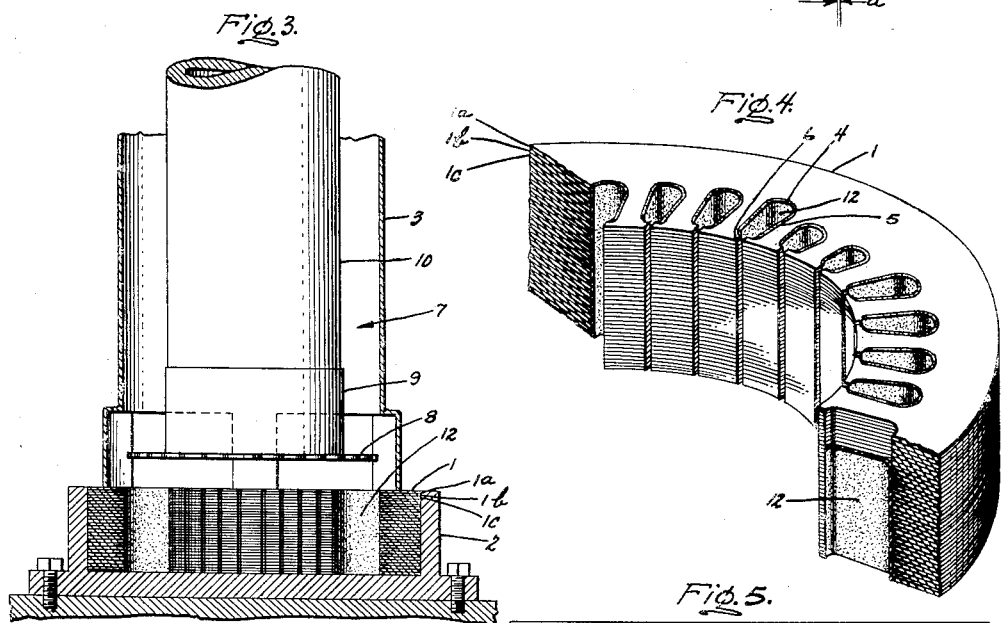
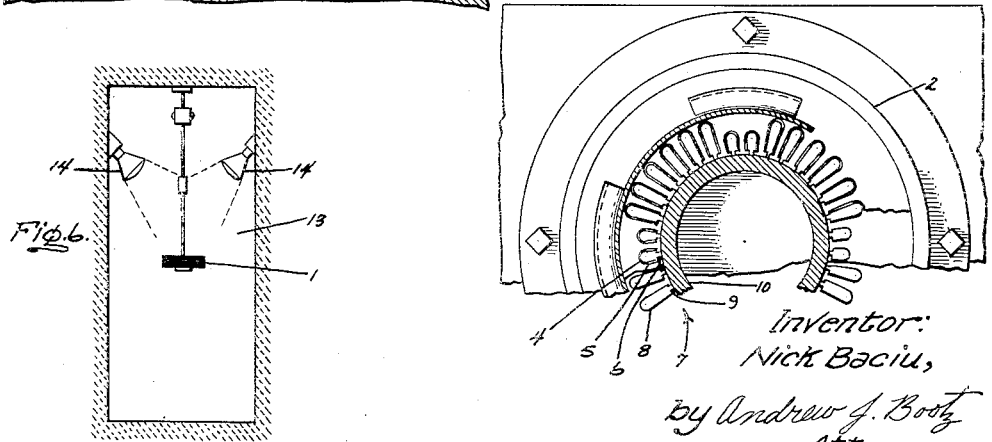

2,978,371

FILM DRAWING PROCESS

Nick Baciu, Fort Wayne, Ind., assignor to General Electric Company, a corporation of New York Filed Nov. 20, 1958, Ser. No. 775,260

6 Claims. (Cl. 154—2.28)

This invention relates generally to a method for applying a fluid coating on a surface of a solid article and more particularly to a film drawing method for applying an integral insulating coating on surfaces of electric inductive devices.

The electric inductive devices such as transformers and dynamoelectric machines conventionally include one or more core members, for example, dynamoelectric machines, i.e., motors and generators, conventionally include a stator core member and a rotor core member concentrically disposed within the stator core member. At least one and frequently both of the core members have a plurality of winding slots formed therein; in the case of a stator core member, the winding slots conventionally extend radially outward from the bore whereas in the case of rotor member, the winding slots conventionally extend radially inward from the outer periphery. The core members are conventionally formed of a plurality of relatively thin laminations punched from magnetic steel and therefore generally have burrs or other sharp edges thereon.

Dynamoelectric machines, at least in the smaller frame sizes, conventionally have their windings, which are positioned in the winding slots, formed of enameled magnet wire, and therefore, if such windings were merely positioned in the slots without other insulation, the burrs and other sharp edges would tend to cause breaks in the enameled insulation on the wire and thus short circuits to the ground would result. For this reason, it has been conventional to employ separate insulators for the winding slots for dynamoelectric machine core members, such insulators being formed of such materials as kraft paper, cellulose acetate, or the newer plastic films; these prior individual slot insulators were conventionally formed with cuff portions at the opposite ends of the slot in order to prevent the portion of the winding which extends beyond the slot, i.e., the end turns, from being shorted to the core at the exterior corners of the slot. Such individual slots and end insulators have been in themselves expensive and their installation has added appreciably to the over all cost of the machines. Further, in spite of careful installation of such slot and end insulators and winding of the wire into the slots, short circuits to ground due to abrasion of the enameled wire have continued.

Also in the past, it has been necessary to assemble the laminated punchings into a unitary core by such means as, for example, riveting, bolting, clamping, or keying. Keys, rivets and the like, and keying machines, riveting machines, and the like likewise have added appreciably to the overal cost of the finished machine.

Thus, it would be very desirable if a method were provided for applying a fluid insulating coating, preferably in a viscous state, to the surface of a solid laminated article, such as the walls of a dynamoelectric machine core member slot, which would hold the laminations united in rigid and strong permanent relation with each other without the need for rivets, keys and the like.

It is therefore an object of this invention to provide an improved method for applying a fluid coating to the surface of a solid article.

Another object of this invention is to provide an improved method for applying integral insulation to the walls of dynamoelectric machine core member windings slots.

A further object of this invention is to provide an improved method for uniting the laminations of an inductive core in strong, rigid and permanent relation.

Another object of the invention is to provide an improved method for insulating the slots of a laminated core and uniting the laminations into a strong rigid core, and which lends itself very easily to mass production.

Briefly stated, according to the invention, the improved method of applying an insulating and bonding coating to the surfaces of a laminated core and uniting the laminations into a single core member comprises spacing a spreader adjacent to the surface to be coated to form a predetermined clearance therebetween, introducing coating material in a state of plasticity on one side of the spreader, producing relative movement of the spreader and surface to thereby draw the coating material along the surface to be coated in a generally uniform layer, and curing the coating to form a combined insulating and bonding covering over the surface.

The coating so produced is continuous, or integral, throughout the length of the surface being coated and so forms an imperforate insulating barrier between the core member itself and the coils later placed in the slot. Further, after the laminations are coated, the laminations act as a wick, and a portion of the coating material is drawn by capillary action between the laminations to form an adhesive coating which, when hardened, bond the laminated structure into a solid core. The balance of the coating which does not penetrate between the laminations remains on the surface walls to form the above mentioned insulation.

The invention together with additional objects and advantages thereof will be best understood from the following description of specific embodiments, when read in connection with the accompanying drawings, in which:

Fig. 1 is an elevation view, in section, illustrating a stack of lamination punching being held together prior to the application of the coating;

Fig. 2 is an elevation view, in section, illustrating a method of applying the coating according to the instant invention;

Fig. 3 is an elevation view, partly in section, just after the coating has been applied to the lamination;

Fig. 4 is a pictorial view, partly in section, illustrating the coating on a motor stator core;

Fig. 5 is a partial plan view illustrating the relationship of the coating applicator to the surface to be coated; and Fig. 6 is a schematic view of a baking furnace suitable for curing the coating.

Referring now to Figs. 1, 2 and 3, wherein is illustrated the method of coating according to the instant invention, a stator core 1 for a conventional electric motor is composed of a stack of lamination punchings 1a, 1b, 1c, etc., and is held together in any manner well known in the art, for example, between the stationary member 2 and the movable jaw 3 which is adapted to move axially relative to the core 1 from the position shown in broken lines. Each lamination contains a series of recesses or slots 4, each slot containing a relatively wide winding section 5 and a narrow neck section 6, as better seen in Figs. 4 and 5. The laminations 1a, 1b, 1c are held in the holding means with their respective slots 4 in axial alignment.

As applied to the instant stator core 1, it is, of course, the purpose of the invention to bond the laminated structure into a solid core 1, and to insulate the winding section 5 of the stator slots 4. At the same time, it may be desirable, in order to facilitate winding of the core, that no insulating material appear in the neck 6 of the slots 4. This may be readily accomplished, according to the instant invention, with an insulating and bonding material in the form of a paste, preferably thixotropic, composed substantially of solids and applied to the surface of the slots 4 of the magnetic cores by use of a spreading applicator shown generally at 7.

The applicator 7 is composed of trowel-like spreaders 8 which are adapted to carry and spread the coating fluid and which allow only a given amount to be spread on the surface of the part to be coated. This is accomplished by forming the shape of the spreader 8 to the surface to be coated, that is, to the winding sections 5, but allowing a clearance between the spreaders 8 and the winding sections 5 equal to the desired thickness of the coating, as is most clearly illustrated in Fig. 5 and identified by the distance $d$ in Fig. 2. The spreaders 8 are attached to guides 9 which are moveable up and down axially to the core through the necks 6 of the slots 4. The guides 9, and in turn the spreaders 8, are fixed in alignment with the slots by attaching them to a carriage ring or cylinder 10 on the applicator 7. The applicator 7 is then a self-guided and aligned unit with respect to the stator core 1. There is substantially no significant clearance between the guides 9 of the applicator and the necks 6 of the slots 4, thereby no significant amount of coating can be deposited in this area; there is, of course, sufficient clearance required between the guides 9 and the necks 6 to permit relative axial movement of these surfaces.

The applicator 7 is first positioned at one end of the slots 4 with the top faces of the spreaders parallel with the surface of the laminations 1a, 1b, 1c. The core is held, as illustrated in Fig. 1, so that the slots are aligned in a vertical position, and the spreaders are then located at the bottom end of the slots. A predetermined amount of fluid 11 sufficient to coat a slot is injected in each slot on top of each spreader. The fluid should have sufficient viscosity to prevent its flowing through the clearance $d$. The guides serve the purpose of confining the fluid to the slot, thus preventing it from being forced through the necks 6. The spreaders are then moved upward, and the fluid continuously contacts the walls of the slots 4. The excess fluid 11 is carried up by the spreaders 8 and only the amount drawn through the clearances $d$ is left as an adherent coating on the walls. When the applicator completes the pass through the slots 4, only small amounts of fluid 11 remain on top of the spreaders 8. The excess fluid is carried through the slots and may be used when the process is repeated with another core. A coating 12, as best seen in Figs. 3 and 4, remains on the sides of the slots 4.

The core 1 is then cured in a furnace 13, being heated by heat lamps 14, as schematically illustrated in Fig. 6, and the coating fluid is hardened to form a permanent, adherent insulating coating and bonding the laminations into a unitary mass to form the core. In the case of the above referred to heat hardenable epoxy resin, the core is baked for a suitable period of, for example, ½ hour at 150° C.; it being understood that the curing of insulation materials is well known in the art and that this invention is not limited to a particular baking time and temperature.

While the above example illustrates the application of the fluid to a motor stator, the method can be used on all surfaces where insulation or bonding of the laminations is desired. Transformer core laminations may be insulated or bonded by the instant method. Further, the end lamination of the stator core as well as other types of magnetic cores can be insulated according to the instant invention.

After the ends of the laminations are coated, a portion of the coating fluid is drawn by wick or capillary action between the laminations (as illustrated by the heavy lines, Fig. 4) and forms an adhesive coating which, after curing as heretofore described, bonds the laminated structure into a solid core. The balance of the coating, of course, remains on the slot walls to form the insulating material.

The coating fluid 11 may be a heat hardenable epoxy resin, in a somewhat viscous fluid form, i.e., in a state of plasticity. It has been found that a thixotropic coating fluid, composed substantially of solids in the form of a paste, produces very satisfactory results. Such a coating fluid contains liquid resin, pigment if desired, filler and a liquid hardener. A liquid hardener is preferable to the heretofore commonly used solid hardener in a granular form in that a solid hardener in granular form may contain particles too large to enter between the laminations and the particles may then be sorted out; the resultant coating between the laminations would then not cure when baked and would therefore add little to the structure in the way of strength.

The coating according to the instant invention is continuous and has uniform thickness. Any desired thickness within functional limits can be applied in one pass of the applicator depending upon the clearance $d$. The thickness $d$ can be changed by changing spreaders 8 having different clearances from the desired surface to be coated. Further, the method makes available a means for applying materials composed of 100% solids and therefore no solvent is necessary as, for example, in the dip application. Thus, there is eliminated the hazards involved when solvents are used, the cost of the solvents is eliminated, the composition of the solution is more readily controlled, and blisters which may result when solvents are driven out in the baking are eliminated. Heavy coatings may be baked without blistering. The method according to the instant invention has the further advantage of eliminating time necessary for the dip operation and the two step baking operations needed in the use of the dipping process to prevent blistering.

Further, the coating is confined to the slots only. This has the advantage that the end laminations of a stator core are free of material and ready for insulating. In the well known dip process for coating the slots, the end laminations are coated very heavy and runs exist which blister in the curing cycle. Further, no masking of the cores is necessary. The inside or outside diameters of the cores may therefore be machined prior to the coating operation; this eliminates the danger of damaging the insulating and bonding coating during machining. Further, the axial slot necks are free of coating material; the winding operation is thereby not hindered. Further, there is no loss of coating material inasmuch as all the coating material is advantageously applied on the desired surfaces.

The method according to the instant invention is readily adaptable to automation and high production.

When the disclosed film drawing process, according to the instant invention, is used for coating end laminations, it has the advantages over the well known spray process in that it eliminates the use of solvents, it eliminates the multi-step baking operation to dry the solvents from the system to prevent blistering, a coating can be applied in the slots and on the end laminations which can be cured simultaneously in a relatively short period of time, and if desired, it can be induction cured. In the prior spraying of the end laminations, more than 50% of the spraying material is lost; in the instant invention there is no fluid lost.

Also, as heretofore discussed, the bonding according to the instant invention eliminates welds, rivets, and the like and produces a core having better mechanical and magnetic properties.

It will be appreciated that there are many modifications and various applications of the method according to the instant invention. In accordance with the patent statutes, I have described what at present are considered to be the preferred embodiments of my invention. However, it will be obvious to those skilled in the art that various changes and modifications may be made in the disclosed structure without departing from my invention, and it is, therefore, aimed in the appended claims to cover all such changes and modifications as fall within the true spirit and scope of my invention.

What I claim as new and desire to secure by Letters Patent of the United States is:

1. A method of applying an insulating coating on a slot in the core member of an electric inductive device comprising introducing a thixotropic insulating material into said slots in a state of plasticity, drawing said insulating material along the surface of said slot in a generally uniform layer to form a coating, and hardening said layer to form a firm insulating coating over said surfaces.

2. A method of applying a coating on a core member of an electric inductive device comprising spacing a spreader from said core member to form a predetermined clearance therebetween, introducing a thixotropic coating material on one side of said spreader, moving said spreader and said member relatively to each other thereby drawing said coating material through said clearance in a generally uniform layer, and hardening said layer to form a firm coating over said member.

3. A method of insulating a core member of an electric inductive device comprising spacing a spreader from said core member to form a predetermined clearance therebetween, introducing a thixotropic insulating material on one side of said spreader, moving said spreader and member relative to each other to draw said coating material through said clearance, and hardening said coating material to form a firmed insulating covering over said member.

4. A method for bonding the laminations of a core member of an electric inductive device comprising stacking said laminations to form a core member, spacing a spreader from the edges of said laminations forming said core member to form a predetermined clearance between said spreader and said edges, introducing a thixotropic coating material on one side of said spreader, moving said spreader and edges relative to each other to draw said coating material through said clearance, further drawing a portion of said coating material between said laminations by capillary action, and hardening said coating material to bond said laminations together.

5. A method for coating a slot in the core member of an electric inductive device comprising positioning in said slot an applicator having a spreader with a predetermined clearance between the spreader and the slot, introducing a viscous coating material into said slot on one side of said spreader, producing relative movement between said core member and said applicator so that said spreader of said applicator draws said material along the walls of said slot in an even layer, and thereafter hardening said material to form a firm coating over said walls.

6. The method of applying a thixotropic fluid coating on the surfaces of recess in a solid article comprising positioning the article with the surfaces of said recess closely spaced from a fluid spreading member, introducing the thixotropic fluid coating into the space between said spreading member and said surfaces and relatively moving said article and said spreader member while maintaining the spacing between said surfaces and said spreading member so that the spreading member draws said fluid onto said surfaces.

References Cited in the file of this patent
UNITED STATES PATENTS 2,437,205   Middleton et al. _____ Mar. 2, 1948

FOREIGN PATENTS 686,308   Great Britain _____ Jan. 21, 1953